(12) United States Patent
Jiang et al.

(10) Patent No.: US 9,074,957 B2
(45) Date of Patent: Jul. 7, 2015

(54) HIGH STABLE FIBER FABRY-PEROT PRESSURE SENSOR WITH GLUE-FREE PACKING AND ITS FABRICATION METHOD

(75) Inventors: Junfeng Jiang, Tianjin (CN); Tiegen Liu, Tianjin (CN); Jinde Yin, Tianjin (CN); Kun Liu, Tianjin (CN); Yu Liu, Tianjin (CN)

(73) Assignee: Tianjin University, Tianjin (CN)

( * ) Notice: Subject to any disclaimer, the term of this patent is extended or adjusted under 35 U.S.C. 154(b) by 0 days.

(21) Appl. No.: 13/880,733

(22) PCT Filed: May 28, 2012

(86) PCT No.: PCT/CN2012/076158
§ 371 (c)(1),
(2), (4) Date: Apr. 20, 2013

(87) PCT Pub. No.: WO2013/020408
PCT Pub. Date: Feb. 14, 2013

(65) Prior Publication Data
US 2014/0208858 A1  Jul. 31, 2014

(30) Foreign Application Priority Data
Aug. 9, 2011  (CN) .......................... 2011 1 0227369

(51) Int. Cl.
*G02B 27/00*  (2006.01)
*G02B 1/00*  (2006.01)
(Continued)

(52) U.S. Cl.
CPC .............. *G01L 11/025* (2013.01); *G02B 26/001* (2013.01); *G02B 5/284* (2013.01); *G02B 5/28* (2013.01); *G02B 6/29358* (2013.01); *G01L 11/02* (2013.01)

(58) Field of Classification Search
CPC ........ G02B 26/001; G02B 5/284; G02B 5/28; G02B 6/29358; G01J 3/26
USPC .................. 359/578, 584, 589; 356/454, 477; 73/705; 385/12–13
See application file for complete search history.

(56) References Cited

U.S. PATENT DOCUMENTS 4,682,500 A * 7/1987 Uda ................................ 73/705
4,825,262 A * 4/1989 Mallinson ..................... 356/454
(Continued)

FOREIGN PATENT DOCUMENTS

CN  100588928 C  *  2/2010

OTHER PUBLICATIONS

Abeysinghe et al. "A Novel Mems Pressure Sensor Fabricated on an Optical Fiber". IEEE Photonics Technology LEtters, vol. 13, No. 9, Sep. 2001. [Acessed Online] Dec. 17, 2014. <http://ieeexplore.ieee.org/stamp/stamp.jsp?arnumber=942671>.*
(Continued)

*Primary Examiner* — Lisa Caputo
*Assistant Examiner* — Jonathan Dunlap
(74) *Attorney, Agent, or Firm* — George G. Wang; Bei & Ocean

(57) ABSTRACT

The present invention relates to a high stable fiber fabry-perot pressure sensor with glue-free packing and its fabrication method. The sensor includes a sensor head, a sensor body with a through-hole in the axial direction and a optical fiber. The sensor head is a 4-layer structure, which includes the first silicon wafer, the first Pyrex glass wafer, the second silicon wafer and the second Pyrex glass wafer. The rear surface of the first silicon wafer forms the first reflecting surface of the fabry-perot (F-P) cavity, and the second silicon wafer provides the second reflecting surface for the F-P cavity. The second Pyrex glass wafer is welded together with the sensor body. The optical fiber is fixed in the sensor body by a $CO_2$ laser welding to achieve the glue-free packing. When the external pressure is applied to deform the first layer silicon wafer, the F-P cavity length will change. When a broad band source is used, the variation of the cavity length can be obtained by collecting the reflection spectrum or low-coherence interference fringe of the sensor, thus the pressure information can be obtained. The structure of the invention can effectively eliminate the affect of environmental factors, such as temperature and humidity, and greatly promoting the measuring accuracy.

6 Claims, 5 Drawing Sheets

(51) Int. Cl.
*G01L 11/02* (2006.01)
*G02B 26/00* (2006.01)
*G02B 5/28* (2006.01)
*G02B 6/293* (2006.01)

(56) References Cited

U.S. PATENT DOCUMENTS

| | | | |
|---|---|---|---|
| 7,689,071 B2* | 3/2010 | Belleville et al. | 385/13 |
| 2002/0003917 A1* | 1/2002 | Sherrer et al. | 385/12 |
| 2005/0062979 A1* | 3/2005 | Zhu et al. | 356/480 |
| 2006/0133715 A1* | 6/2006 | Belleville et al. | 385/13 |
| 2007/0013914 A1* | 1/2007 | May et al. | 356/480 |
| 2014/0318273 A1* | 10/2014 | Dong et al. | 73/862.624 |

OTHER PUBLICATIONS

Xu et al. "Miniature all-silica fiber optic pressure and acoustic sensors". Optics Letters, vol. 30, No. 24, Dec. 15, 2005. [Acessed Online] Dec. 17, 2014. <http://www.opticsinfobase.org/ol/viewmedia.cfm?uri=ol-30-24-3269&seq=0>.*

Wang et al. "Diaphragm design guidelines and an optical pressure sensor based on MEMS technique". Microelectronics Journal, vol. 37 (2006). pp. 50-56. [Acessed Online] Dec. 17, 2014. <http://www.sciencedirect.com/science/article/pii/S0026269205002521/pdfft?md5=1b227ed74e0c36dca6f0b3e095727652&pid=1-s2.0-S0026269205002521-main.pdf>.*

* cited by examiner

HIGH STABLE FIBER FABRY-PEROT PRESSURE SENSOR WITH GLUE-FREE PACKING AND ITS FABRICATION METHOD

TECHNICAL FIELD

The invention relates to the technical field of fiber pressure sensor, and the present sensor can be used for detecting the relative pressure and absolute pressure of liquid or gas, and also can be used for detecting the signals of sound wave and ultrasound.

BACKGROUND

Fiber fabry-perot (F-P) pressure sensor is a kind of fiber optic pressure sensor, which is usually constituted by an F-P micro resonant cavity formed by an end face of fiber and rear surface of a diaphragm. When the pressure is applied onto the diaphragm to deform it, the length of the F-P cavity is changed, thus achieving sensing. Some design schemes are presented in recent years, such as Don C. Abeysinghe et. al. in 2011 (Don C. Abeysinghe, Samhita Dasgupta, Joseph T. Boyd, Howard E. Jackson, A Novel MEMS pressure sensor fabricated on an optical fiber, IEEE Photonics Technology Letters, 2001, 13(9):993-995) discloses a sensor of which the end surface of the multi-mode fiber is etched to form a microcavity, then a silicon is bonded with the end surface to form a sensor, wherein the cladding diameters of multi-mode fibers are 200 µm and 400 µm respectively, while the core diameter are 190 µm and 360 µm respectively; Juncheng Xu et. al. in 2005 (Juncheng Xu, Xingwei Wang, Kristie L. Cooper, Anbo Wang, Miniature all-silica fiber optic pressure and acoustic sensors, Optics Letters, 2005, 30(24):3269-3271) discloses a fiber fabry-perot (F-P) pressure sensor, which uses hydrofluoric acid for etching large core silica fiber to obtain the silica diaphragm, and the silica diaphragm is spliced with the end face of the capillary tube. The cutted end face of the single-mode fiber is inserted into the capillary tube, which combines the silica diaphragm to form the fiber F-P pressure sensor; Xiaodong Wang et. al. in 2006 (Xiaodong Wang, Baoqing Li, Onofrio L. Russo, et. al., Diaphragm design guidelines and an optical pressure sensor based on MEMS technique, Journal of microelectronics, 2006, 37:50-56) discloses a fiber fabry-perot cavity, which includes a microcavity, wherein the microcavity is fabricated on the Pyrex glass with thickness of 500 µm, then the silicon is bonded on the Pyrex glass, which combines the end face of the fiber which is inserted into the cavity to form the fiber F-P pressure sensor; Ming Wang et. al. in 2006 (Ming Wang, Xuxing Chen, Yixian Ge et. al., fabry-perot type fiber pressure sensor and the manufacturing method thereof, Chinese application No. 200610096596.5) discloses a fiber fabry-perot cavity, which includes a monocrystalline silicon wafer, a glass circular tube, a fiber flange and a fiber plug. Presently, the packing of the most diaphragm fiber F-P sensors are glue packing, which deteriorate the tolerance of sensor to the temperature and humidity. Although the method of Juncheng Xu et. al. disclosed in 2005 can realize non-glue packing, the method has restricted the material of the diaphragm only to be silica, the monocrystalline silicon wafer with better mechanical properties cannot be used, and the method is not suitable for mass production.

SUMMARY OF THE INVENTION

The object of the invention is to overcome the drawbacks of the above-mentioned problems, and to provide a new structure of a high stable fiber fabry-perot pressure sensor with glue-free packing and its fabrication method.

The present invention is based on the analysis and research of the existing problems of the traditional fiber fabry-perot sensor. The structure of the sensor eliminates the defect of glue packing in the traditional fiber fabry-perot sensor, which make the accuracy easily affected by the environmental temperature and humidity. At the same time, the structure can adopt the monocrystalline silicon wafer which has better mechanical properties and improves the precision, reliability and service life of the sensor.

The high stable fiber fabry-perot pressure sensor with glue-free packing provided by the invention includes:

A sensor head:

The sensor head is a 4-layer structure. The first layer is the first silicon wafer, which is used as an elastic diaphragm for sensing the pressure. The rear surface of the first silicon wafer forms the first reflecting surface of the fabry-perot (F-P) cavity. The second layer is the first Pyrex glass wafer which has been shaped as a ring with a through hole in the axis. The thickness of the first Pyrex glass wafer determines the original length of the F-P cavity; the third layer is the second silicon wafer which is used to form the second reflecting surface of the F-P cavity. The forth layer is the second Pyrex glass wafer, of which a through hole is processed in the axial direction for locating the position of the front end of the transmission optical fiber;

A sensor body:

The sensor body is shaped as a cylinder or rectangular to be used for the supporting structure of the sensor and the containing structure of the transmission optical fiber. The middle part of the sensor body is processed a through hole in an axial direction, the sensor body being made of Pyrex glass or K9 glass. The front end face of the sensor body is spliced with the rear end face of the second Pyrex glass wafer.

A transmission optical fiber:

The transmission optical fiber travels through the through hole which is in the middle of the sensor body in the axial direction; the transmission optical fiber is used for transmitting incident light and emergent light by arranging the front end of the transmission fiber in the through hole which is located in the middle of the second Pyrex glass wafer, and arranging the front-end surface of the transmission fiber being closely jointed together with the rear-end surface of the second silicon wafer. The types of the transmission optical fiber includes single mode optical fiber and multimode optical fiber.

The invention also provides a fabrication method of the high stable fiber fabry-perot pressure sensor with glue-free packing, wherein the method includes:

a. double-side polishing the 4 inches of the first Pyrex glass wafer for thinning into the thickness of 100 µm~400 µm; drilling the through holes array on the Pyrex glass wafer, the diameter of the through holes being of 0.8 mm~3 mm. The first Pyrex glass wafer is used as the second layer of the sensor head for forming a F-P cavity body and supporting the silicon wafer;

b. cleaning the double-side polished 4 inches of the silicon wafer which has a thickness of 10 µm~50 µm, then bonding the silicon wafer with the first Pyrex glass wafer processed in step a by anodic bonding;

c. double-side polishing the 4 inches of the second Pyrex glass wafer for thinning into the thickness of 300 µm~450 µm, drilling the through holes array on the Pyrex glass wafer, and the diameter of the through holes is of 127 µm~135 µm. The central of the holes in the array keep concentric with the through holes of 4 inches of the first Pyrex glass wafer. The second Pyrex glass wafer is used for the forth layer of the sensor head;

d. cleaning the double-side polished 4 inches of the silicon wafer which has a thickness of 50 μm~400 μm, then bonding the silicon wafer with the second Pyrex glass wafer processed in step c by anodic bonding. The bonded wafer being used for the silicon wafer of the third layer;

e. cleaning the silicon glass wafer assembly bonded with the third layer and the forth layer of the sensor head, cleaning the silicon glass wafer assembly bonded with the first layer and the second layer of the sensor head. Contacting the unbonded surface of the silicon wafer of the third layer and unbonded surface of the Pyrex glass of the second layer, meanwhile, the through holes array of the Pyrex glass of the second layer and the through holes array of the Pyrex glass of the forth layer are positioned concentrically, then anodic bonding them in vacuum by applying voltage to form a sensor head array wafer having a four-layer structure;

f. texture processing the external surface of the first layer silicon wafer of 4 inches of sensor head array wafer by adopting Nd: YAG laser processing system;

g. Dicing the 4 inches of sensor head array wafer by adopting dicing machine into sensor head units with shape of circular or square; producing the sensor body into a cylinder or rectangular shape with the material of Pyrex glass or fused silica, the external diameter of the sensor body being of 1 mm~5 mm, the length being of 5 mm~15 mm; then drilling the middle part of the sensor body to form a through hole of which the diameter is of 127 μm. The through hole of the forth layer Pyrex glass of the sensor head accurately aligns with the through hole of sensor body. And the forth layer of the sensor head and the sensor body are laser welded by $CO_2$ laser to join them together;

h. inserting the transmission optical fiber into the other side of the through hole of the sensor body, the end face of the optical fiber being jointed closely with the third layer silicon wafer of the sensor head; measuring whether the transmission optical fiber is achieved the designated position by spectrometer. Illuminating the through hole and transmission optical fiber by the $CO_2$ laser at the position of 2 mm~4 mm away from the end of the sensor body, thus fixing the optical fiber and the sensor body by laser welding. Covering the optical fiber protective sleeve to the optical fiber and coating epoxy resin on the end of the sensor, then solidifying them in the electrothermic box at 60° C. for an hour or at room-temperature for 24 hours, thus the high stable fiber fabry-perot pressure sensor with glue-free packing is finished.

The invention also provides a simplified fabrication method of the high stable fiber fabry-perot pressure sensor with glue-free packing, which includes:

a. double-side polishing the 4 inches of the first Pyrex glass wafer for thinning into the thickness of 100 μm~400 μm; drilling the through holes array on the Pyrex glass wafer, the diameter of the through holes being of 0.8 mm~3 mm. The first Pyrex glass wafer is used as the second layer of the sensor head for forming an F-P cavity body and supporting the silicon wafer;

b. cleaning the double-side polished 4 inches the silicon wafer which has a thickness of 10 μm~50 μm, then bonding the silicon wafer with the first Pyrex glass wafer processed in step a by anodic bonding;

c. texture processing the external surface of the first layer silicon wafer of 4 inches of sensor head array wafers by adopting Nd: YAG laser processing system;

d. Dicing the 4 inches of sensor head array wafer by adopting dicing machine into sensor head units; producing the sensor body into a cylinder or rectangular shape with the material of Pyrex glass or fused silica, the external diameter of the sensor body being of 1 mm~5 mm, the length being of 5 mm~15 mm; then drilling the middle part of the sensor body to form a through hole of which the diameter is of 127 μm. The through hole of the forth layer Pyrex glass of the sensor head accurately aligns with the through hole of sensor body. And the forth layer of the sensor head and the sensor body are laser welded by $CO_2$ laser to join them together;

e. inserting the transmission optical fiber into the other side of the through hole of the sensor body, the end surface of the fiber being not contacted with the silicon wafer of the sensor head; measuring whether the transmission optical fiber is achieved the designed position by spectrometer; illuminating the through hole and transmission optical fiber by the $CO_2$ laser at the position of 2 mm~4 mm away from the end of the sensor body, thus fixing the optical fiber and the sensor body by laser welding; covering the fiber protective sleeve to the fiber and coating epoxy resin on the end of the sensor, then solidifying them in the electrothermic box at 60° C. for an hour or at room-temperature for 24 hours, thus finishing the sensor.

The working process of fiber fabry-perot pressure sensor with 4-layer structured sensor head is as follows:

When the pressure is applied, the first layer silicon wafer of the sensor head is deformed, thus changing the distance between the first silicon wafer and the third silicon wafer of the sensor head, namely, the cavity length of the fabry-perot cavity. After leading into the broad band source, the variation of the cavity length can be obtained by acquiring the reflection spectrum or low-coherence interference fringe of the sensor, thus achieving the pressure information.

The advantages and positive effects of the invention are:

1. The fiber fabry-perot pressure sensor of the invention adopts 4-layer structure, and the joint of the key component adopts anodic bonding and $CO_2$ laser welding, which realizes sealed vacuum cavity easily, and effectively eliminates the affect of the variation of temperature and humidity on sensing, thus greatly improves the measuring accuracy.

2. The fiber fabry-perot pressure sensor and the fabrication method of this invention adopts 4 inches of wafer, which is convenient for mass production, thus effectively improving the production efficiency, ensuring the consistency of the sensor and reducing the cost of the single sensor.

In the figures, 1 is the first silicon wafer, 2 is the first Pyrex glass wafer, 3 is the central through hole of the first Pyrex glass wafer, 4 is the second silicon wafer, 5 is the second Pyrex glass wafer, 6 is the central through hole of the second Pyrex glass wafer, 7 is the sensor body, 8 is the through hole of the sensor body in central axial direction, 9 is the transmission optical fiber, 10 is the front surface of the sensor body, 11 is the rear surface of the second Pyrex glass wafer, 12 is the rear surface of the second silicon wafer, 13 is the front surface of the second silicon wafer, 14 is the rear surface of the first silicon wafer, 15 is the rear surface of the first Pyrex glass wafer, 16 is the broad band source, 17 is the optical circulator, 18 is the sensor, 19 is the spectrometer.

DETAILED DESCRIPTION OF THE INVENTION

Example 1

The Embodiment of the First Fiber Fabry-Perot Pressure Sensor

Figure 1:
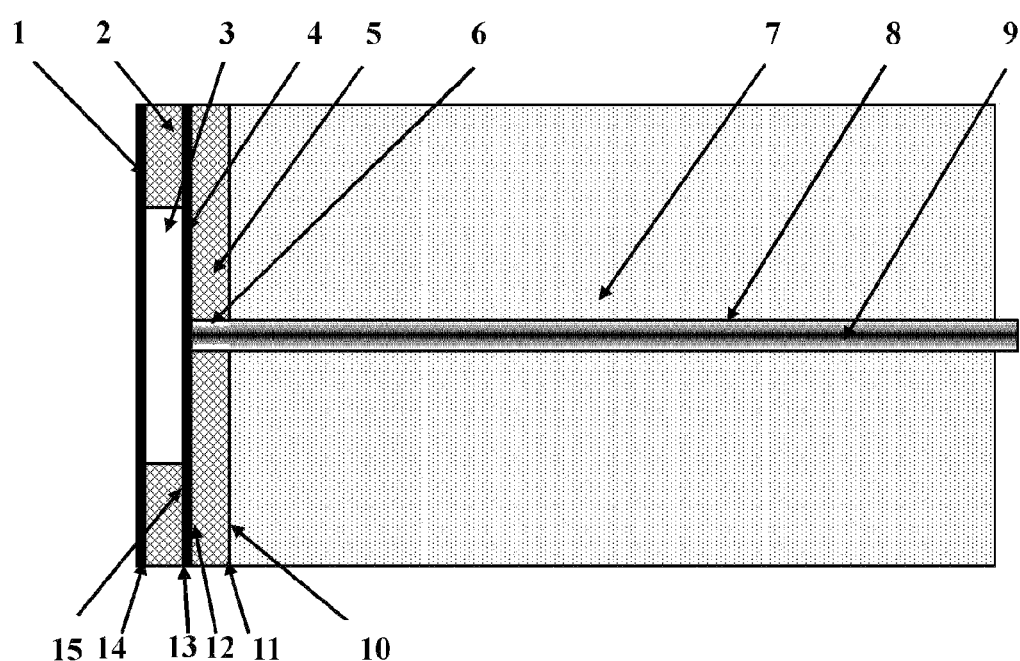
FIG. 1 is a schematic diagram of the first fiber fabry-perot pressure sensor of the present invention.

As shown in FIG. 1, the fiber fabry-perot pressure sensor includes a sensor head, a sensor body 7 and a transmission optical fiber 9. The sensor head has 4-layer structure, of which the first layer is the first silicon wafer 1, the second layer is the first Pyrex glass wafer 2, the third layer is the second silicon wafer 4, and the forth layer is the second Pyrex glass wafer 5. The first silicon wafer 1 is used as an elastic diaphragm for sensing the pressure. The rear surface 14 of the first silicon wafer forms the first reflective surface of the fabry-perot (F-P) cavity. The first Pyrex glass wafer 2 which is shaped as a ring is processed to have a through hole 3 in the middle part. The thickness of the first Pyrex glass wafer 2 determines the initial length of the F-P cavity. The front surface 13 of the second silicon wafer 4 is used for providing the second reflective surface of the F-P cavity. The through hole 6 is processed in the middle of the second Pyrex glass wafer 5, which is used for locating the fiber. The first silicon wafer 1 is bonded with the first Pyrex glass wafer 2 by anodic bonding, and the second silicon wafer 4 is bonded with the second Pyrex glass wafer 5 by anodic bonding. Then, contacting the rear surface 15 of the first Pyrex glass wafer 2 and the front surface 13 of the second silicon wafer 4 closely; meanwhile, ensuring the through hole 3 and the through hole 6 are concentrically positioned, then bonding them by anodic bonding or vacuum anodic bonding, thus forming the four-layer structure.

The Nd: YAG laser processing system is adopted for texture processing the external surface of the first silicon wafer 1 of the sensor head. The thickness of the first silicon wafer 1 and the diameter of the through hole 3 of the first Pyrex glass wafer 2 determine the pressure sensitivity. The sensor body 7 is made with Pyrex glass, which is drilled to have a through hole 8 in the middle part in an axial direction. Contact the rear surface 11 of the second Pyrex glass wafer 5 of the sensor head and the front surface 10 of the sensor body 7 closely, then weld the second Pyrex glass wafer 5 of the sensor head and the sensor body 7 by $CO_2$ laser to joint together, insert the transmission optical fiber 9 into the through hole 8, keep the front end of transmission optical fiber 9 and the rear surface 12 of the second silicon wafer 4 contacted closely, then fix the transmission optical fiber 9 with the sensor body 7 by $CO_2$ laser for inputting and outputting the signal light.

The first silicon wafer 1 is deformed when pressure is applied on, and the distance between the rear surface 14 of the first silicon wafer 1 and the front surface 13 of the second silicon wafer 4 is changed, namely, the cavity length of the fabry-perot cavity is changed, thus converting the pressure information to the cavity length sensing information.

The fiber fabry-perot pressure sensor in this embodiment of the invention has the following features.

1. The manufacture of the silicon wafer and Pyrex glass wafer of the sensor head adopts 4 inches of the wafer. The wafer of other specifications can also be adopted if required, such as wafers of 3 inches and 6 inches large in diameter;

2. Fused silica material can be used for producing the sensor body;

3. The optical fiber includes single-mode fiber, multi-mode fiber or other large core fiber.

Example 2

The Embodiment of the Second Fiber Fabry-Perot Pressure Sensor

Figure 2:
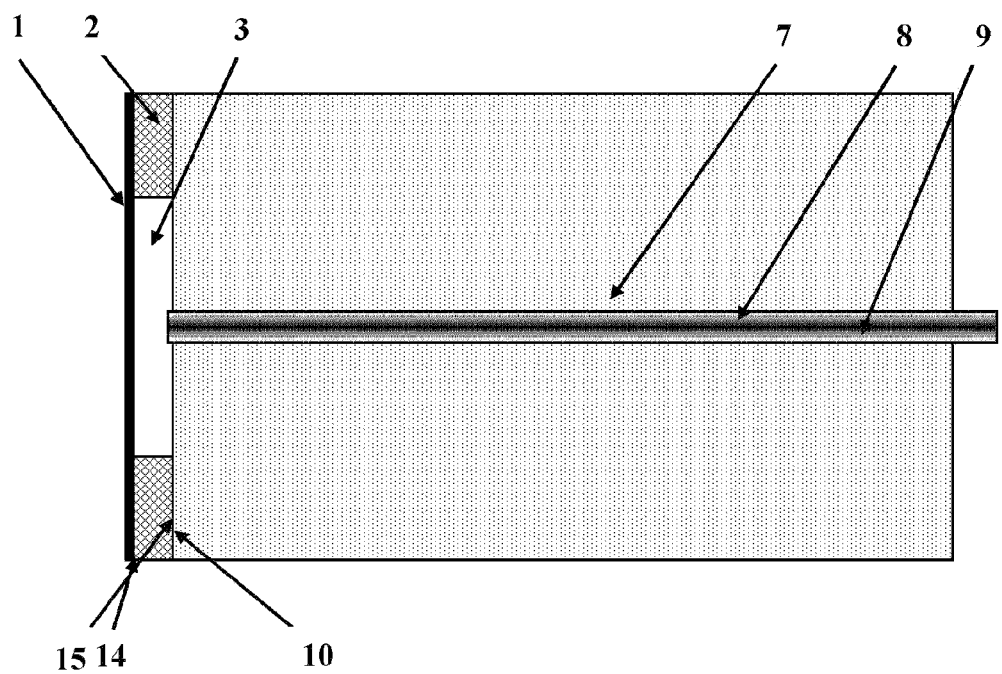
FIG. 2 is a schematic diagram of the second fiber fabry-perot pressure sensor of the present invention.

As shown in FIG. 2, the fiber fabry-perot pressure sensor includes a sensor head, a sensor body 7 and a transmission optical fiber 9. The sensor head has 2-layer structure, of which the first layer is the silicon wafer 1, whereas the second layer is the Pyrex glass wafer 2. The silicon wafer 1 is used as an elastic diaphragm for sensing the pressure. The inner surface 14 of the silicon wafer forms the first reflective surface of the fabry-perot (F-P) cavity. The Pyrex glass wafer 2 is processed to have a through hole 3 in the middle part thereof. The thickness of the Pyrex glass wafer 2 determines the initial length of the F-P cavity. The silicon wafer 1 is bonded with the Pyrex glass wafer 2 by anodic bonding. The Nd: YAG laser processing system is adopted for texture processing the external surface of the silicon wafer 1 of the sensor head. The thickness of the silicon wafer 1 and the diameter of the through hole 3 of the Pyrex glass wafer 2 determine the pressure sensitivity. The sensor body 7 is made by Pyrex glass, which is drilled to have a through hole 8 in the middle part in an axial direction. Contact the rear surface 15 of the Pyrex glass wafer 2 of the sensor head and the front surface 10 of the sensor body 7 closely, and then weld them by $CO_2$ laser to joint them together. The transmission optical fiber 9 is inserted into the through hole 8, the front end face of the transmission optical fiber 9 and the inner surface 14 of the silicon wafer 1 form the two reflective surfaces of the fabry-perot (F-P) cavity. Observing the interference pattern (shown as FIG. 4) of the F-P cavity by the spectrometer, the cavity length can be obtained by calculating the wavelength information of the interference pattern. By moving transmission optical fiber 9, the cavity length can reach the measuring environmental requirements. Meanwhile, fix the transmission optical fiber 9 into the through hole 8 of the sensor body 7 by a $CO_2$ laser for inputting and outputting the signal light. The silicon wafer 1 is deformed when pressure is applied thereon, and the distance between the inner surface 14 of the silicon wafer 1 and the front end face of the transmission optical fiber 9 is changed, namely, the cavity length of the fabry-perot cavity is changed, thus converting the pressure information to the cavity length sensing information.

The fiber fabry-perot pressure sensor in this embodiment of the invention has the following features.

1. The manufacture of the silicon wafer and Pyrex glass wafer of the sensor head adopts 4 inches of the wafer. The wafer of other specifications can also be adopted if required, such as those has a diameter of 3 inches and 6 inches;

2. Fused silica material can be used for producing the sensor body;

3. The optical fiber includes single-mode fiber, multi-mode fiber and other large core fiber.

Example 3

The Cavity Length Demodulation of the Fiber Fabry-Perot Pressure Sensor

Figure 3:
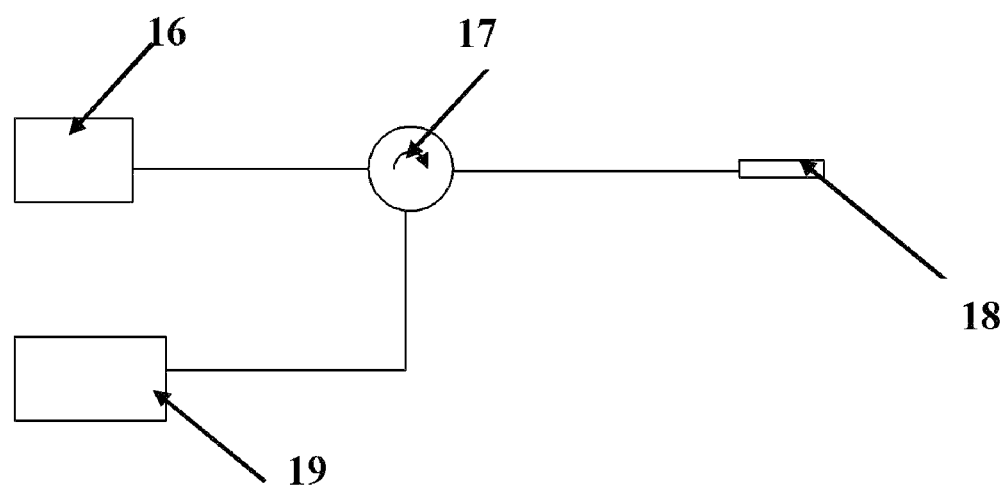
FIG. 3 is the spectrum demodulating system schematic diagram of the fiber fabry-perot pressure sensor of the present invention.

The sensing system of the fiber fabry-perot pressure sensor is shown in FIG. 3, and the emitted light from the cavity length demodulation broad band source 16 passes into the sensor 18 by the optical circulator 17. After passing the F-P cavity of the sensor, the light passes into spectrometer 19 by the optical circulator 17. Scanned by the spectrometer 19, the spectrum returned by the sensor can be gotten. Further, the cavity length of the fiber F-P pressure sensor can be gotten by calculating the peak positions of the spectral envelope. The relation between the F-P cavity length and its interference spectrum is:

$$d = \frac{\lambda_1 \lambda_2}{2(\lambda_1 - \lambda_2)},$$

wherein, d is F-P cavity length, while $\lambda_1$, $\lambda_2$ are the two peak positions of the spectral envelope separately. The F-P cavity length can be further converted into pressure information, whereas the relation between the F-P cavity length and pressure is:

$$\Delta d = \frac{3\left(\frac{B}{2}\right)^4 (1-v^2)}{16EC^3} P.$$

Wherein, $\Delta d$ is the variation of F-P cavity length, P is the pressure, E is Young Modulus of the first silicon wafer 1, v is Poisson ration of the first silicon wafer 1, B is the diameter of the through hole 3 of the first Pyrex glass wafer in the middle part, and C is the thickness of the first silicon wafer 1.

Figure 4:
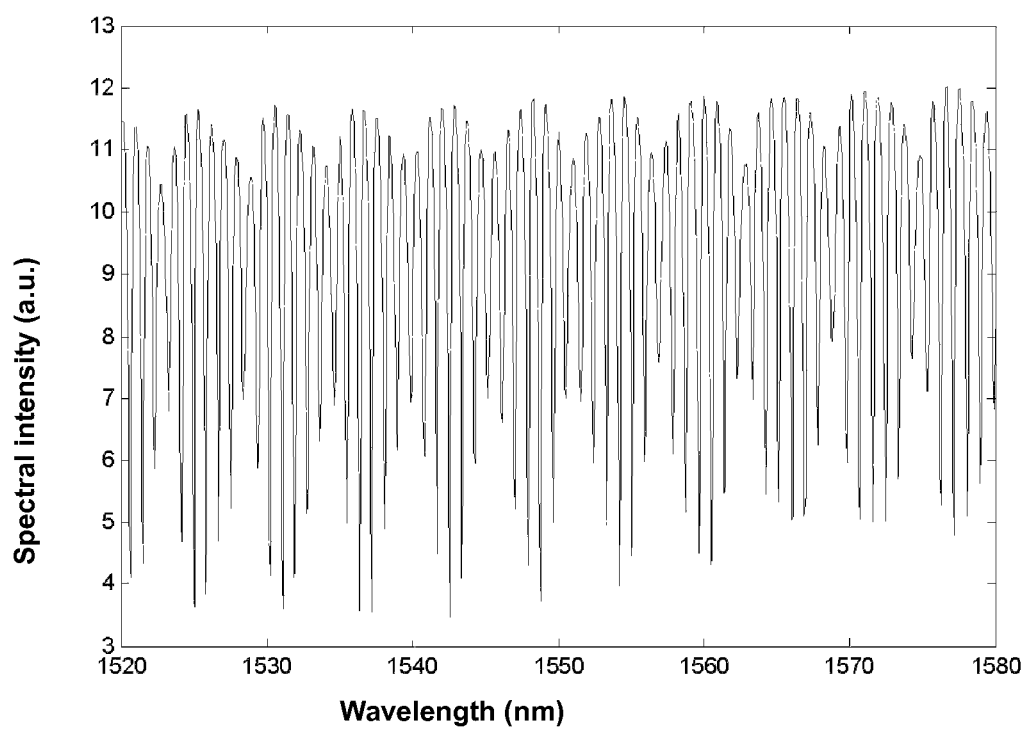
FIG. 4 is the reflecting spectrum of the fiber fabry-perot pressure sensor with 4-layer structure.
Figure 5:
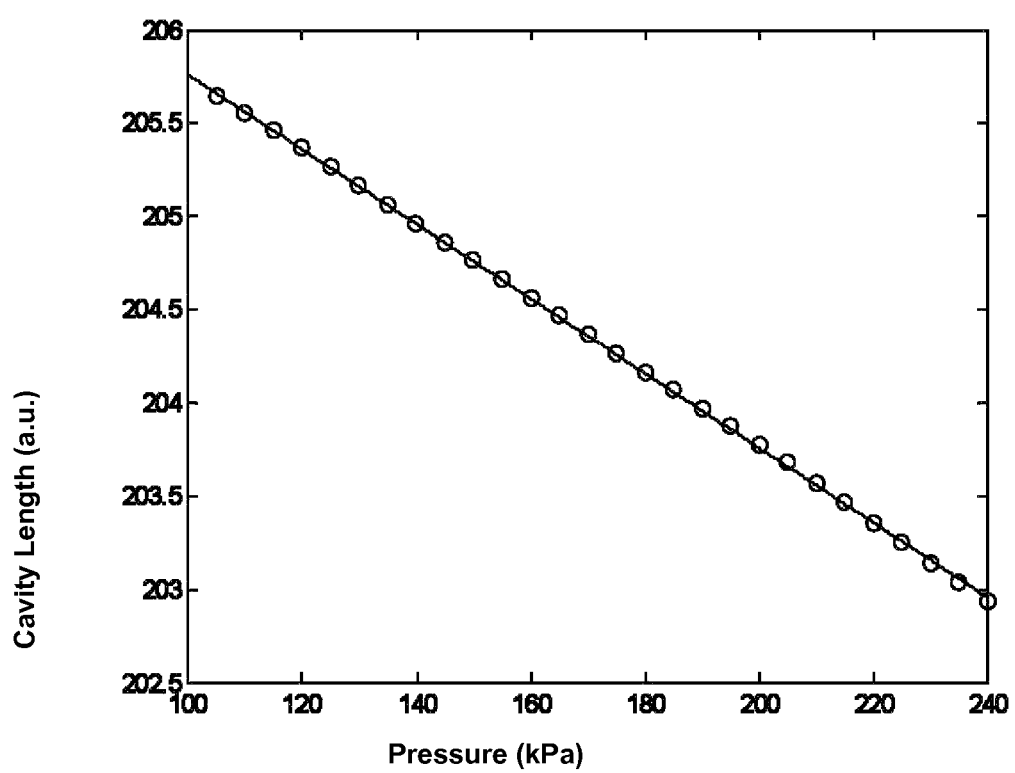
FIG. 5 is the pressure response curve of the fiber fabry-perot pressure sensor.

FIG. 4 is the spectrum of the fiber fabry-perot pressure sensor of the embodiment 1 measured by the spectrometer, wherein, the sensor adopts single-mode fiber, and the thickness of the first silicon wafer 1 of the sensor is 20 μm, and the thickness of the second silicon wafer 4 of the sensor is 400 μm. FIG. 5 is the pressure response curve of the fiber fabry-perot pressure sensor at the pressure range from 100 kPa to 240 kPa.

What is claimed is:

1. A high stable fiber fabry-perot pressure sensor with glue-free packing, comprising:
   (a) a sensor head with a fabry-perot cavity, being a 4-layer structure where a first layer is a silicon wafer for sensing a pressure and has a rear surface forming a first reflecting surface of said fabry-perot cavity, a second layer is a first Pyrex glass wafer shaped as a ring with a through hole, a third layer is a second silicon wafer forming a second reflecting surface of said fabry-perot cavity, and a fourth layer is a second Pyrex glass wafer having a through hole and a rear end face;
   (b) a sensor body of a cylinder or rectangular shape having a through hole and being made of Pyrex glass or K9 glass, said sensor body having a front end face spliced with said rear end face of said second Pyrex glass wafer;
   (c) a transmission optical fiber, having a front end face disposed into said through hole of said sensor body for transmitting incident light and emergent light, and said front end face of said transmission optical fiber is in contact with said rear end face of said second silicon wafer; and
   wherein said four layers of said sensor head bonded to each other by anodic bonding to form bonds which comprise no glue.

2. The high stable fiber fabry-perot pressure sensor of claim 1, wherein said transmission optical fiber is a single mode optical fiber.

3. The high stable fiber fabry-perot pressure sensor of claim 1, wherein said transmission optical fiber is a multi-mode optical fiber.

4. A method for fabricating a high stable fiber fabry-perot pressure sensor with glue-free packing, comprises the following steps:
   (a) double-side polishing a first Pyrex glass wafer until reaching a thickness of 100 μm-400 μm and drilling an array of through holes on said first Pyrex glass wafer;
   (b) cleaning a first double-side polished silicon wafer and then bonding said silicon wafer to said first Pyrex glass wafer by anodic bonding without using any glue to form a first silicon glass wafer assembly;
   (c) double-side polishing a second Pyrex glass wafer until reaching a thickness of 300 μm-450 μm and drilling an array of through holes on said second Pyrex glass wafer;
   (d) cleaning a second double-side polished silicon wafer and then bonding said silicon wafer to said second Pyrex glass wafer by anodic bonding without using any glue to form a second silicon glass water assembly;
   (e) cleaning said first and second silicon glass wafer assemblies and bonding them together to form a four-layer structured sensor head where each of said through holes of said first Pyrex glass wafer is positioned concentrically with a corresponding through hole of said second Pyrex glass wafer and bonding is performed via anodic bonding in a vacuum;
   (f) texture processing of an external surface of first Pyrex glass wafer;
   (g) dicing said sensor head into a desired dimension, drilling a central through hole in a sensor body, aligning said central through hole with a through hole of said second Pyrex glass wafer of said sensor head, and welding said second Pyrex glass wafer to said sensor body by a $CO_2$ laser;
   (h) inserting a transmission optical fiber into said through hole of said sensor body where an end face of said transmission optical fiber is in contact with said second silicon wafer of said sensor head and, after ensuring a desired position of said transmission optical fiber relative to said sensor body, welding said transmission optical fiber to said sensor body by a $CO_2$ laser.

5. The method according to claim 4, wherein said through holes of said first Pyrex glass wafer are 0.8 mm-3 mm in diameter, and said through holes of said second Pyrex glass water are 127 μm-135 μm in diameter.

6. The method according to claim 4, wherein said central through hole of said sensor body is 127 μm in diameter.

* * * * *